United States Patent

Laakso et al.

Patent Number: 5,933,423
Date of Patent: Aug. 3, 1999

[54] RECEPTION METHOD, AND A RECEIVER

[75] Inventors: Timo Laakso, Helsinki; Jorma Lilleberg, Oulu; Ari Hottinen, Vantaa, all of Finland

[73] Assignee: Nokia Telecommunications Oy, Salo, Finland

[21] Appl. No.: 08/602,773

[22] PCT Filed: Jul. 3, 1995

[86] PCT No.: PCT/FI95/00384

§ 371 Date: Apr. 19, 1996

§ 102(e) Date: Apr. 19, 1996

[87] PCT Pub. No.: WO96/01544

PCT Pub. Date: Jan. 18, 1996

[30] Foreign Application Priority Data

Jul. 4, 1994 [FI] Finland .................................. 943196

[51] Int. Cl.⁶ .................................................. H04B 7/216
[52] U.S. Cl. .......................................... 370/335; 455/561
[58] Field of Search ..................................... 370/320, 328, 370/335, 342, 318, 331, 332; 375/262, 208, 200; 455/270, 561, 296, 298, 343

[56] References Cited

U.S. PATENT DOCUMENTS

| 5,230,078 | 7/1993 | Varela et al. ........................ 455/67.1 |
| 5,280,472 | 1/1994 | Gilhousen et al. ...................... 370/18 |
| 5,287,544 | 2/1994 | Menich et al. ........................ 455/33.1 |
| 5,506,861 | 4/1996 | Bottomley .............................. 375/200 |
| 5,533,047 | 7/1996 | Mourot et al. ......................... 375/208 |
| 5,566,209 | 10/1996 | Forssen et al. ....................... 375/262 |
| 5,579,304 | 11/1996 | Sugimoto et al. ....................... 370/18 |
| 5,671,221 | 9/1997 | Yang ..................................... 370/320 |

FOREIGN PATENT DOCUMENTS

| 0 485 935 | 5/1992 | European Pat. Off. ......... H04Q 7/04 |
| 0 491 668 | 6/1992 | European Pat. Off. ......... H04J 13/00 |
| 0 546 720 | 6/1993 | European Pat. Off. ......... H04Q 7/04 |
| 2 266 433 | 10/1993 | United Kingdom ............. H04A 7/04 |

OTHER PUBLICATIONS

Varanasi et al., "Multistage Detection i Asynchronous Code–Division Multiple–Access Communications", *IEEE Transactions on Communications*, vol. 38, No. 4, Apr. 1990, pp. 509–519.

Lupas et al., "Linear Multiuser Detectors for Synchronous Code–Division Multiple–Access Channels", *IEEE Transactions on Information Theory*, vol. 35, No. 1, Jan. 1989, pp. 123–136.

Lupas et al., "Near–Far Resistance of Multiuser Detectors in Asynchronous Channels", *IEEE Transactions on Communications*, vol. 38, No. 4, Apr. 1990, pp. 496–508.

*Primary Examiner*—Ajit Patel
*Assistant Examiner*—Chiho Andrew Lee
*Attorney, Agent, or Firm*—IP Group of Pillsbury Madison & Sutro LLP

[57] ABSTRACT

A reception method and a receiver in a cellular radio system, the receiver comprising means for measuring the power level of each received signal. To detect the received signal in an advantageous manner, the receiver of the invention comprises means for dividing the received signals into several groups having at least two signals each, and means for detecting the signals in each groups from the received transmission simultaneously.

15 Claims, 2 Drawing Sheets

– 1 –

RECEPTION METHOD, AND A RECEIVER

FIELD OF THE INVENTION

This invention relates to reception in a cellular radio system in which the receiver measures the power level of each received signal.

BACKGROUND

A central problem in designing and implementing a data transmission system is simultaneous transmission and reception of signals from several simultaneous users such that the signals interfere with one another as little as possible. Because of this and the transmission capacity used, various transmission protocols and multiple access methods have been used, the most common especially in mobile phone traffic being FDMA and TDMA, and recently CDMA.

CDMA is a multiple access method based on a spread spectrum technique, and it has been recently put; into use in cellular radio systems in addition to previously used FDMA and TDMA. CDMA has many advantages over the prior methods, such as simplicity of frequency planning, and spectrum efficiency.

In a CDMA method, a narrow-band data signal of a user is multiplied to a relatively broadband by a spreading code having a much broader band than the data signal. Bandwidths used in known test systems include e.g. 1.25 MHz, 10 MHz and 25 MHz. The multiplication spreads the data signal over the entire band to be used. All the users transmit simultaneously on the same frequency band. On each connection between a base station and a mobile station is used a different spreading code, and the signals of the users can be distinguished from one another in the receivers on the basis of the spreading code of the user. If possible, the spreading codes are selected in such a way that they are mutually orthogonal, i.e. they do not correlate with one another.

Correlators in conventionally implemented CDMA receivers are synchronized with a desired signal, which they recognize on the basis of the spreading code. In the receiver the data signal is restored to the original band by multiplying it by the same spreading code as in the transmission step. Ideally, the signals that have been multiplied by some other spreading code do not correlate and are not restored to the narrowband. In view of the desired signal, they thus appear as noise. The object is to detect the signal of the desired user from among a number of interfering signals. In practice, the spreading codes correlate, and the signals of the other users make it more difficult to detect the desired signal by distorting the received signal. This interference caused by the users to one another is called. multiple access interference.

In a data transmission method in which a TDM multiple access method is applied several frequencies are used, each frequency being divided into time slots in which the signals of the different users are placed. Each user is thus assigned a time slot of its own. Since the frequency band reserved for the system is usually limited, the frequencies used must be repeated in the cells located at a certain distance. To achieve high frequency efficiency, the distance must be held as short as possible. It follows from this that transmissions sent at the same frequencies interfere with one another. In a certain time slot, not only the desired signal but also a noise signal is heard in the receiver, the noise signal being caused by some other connection using the same frequency.

The one-frequency detection method described above in connection with CDMA is not optimal, since the information contained in the signals of the other users is not taken into account in the detection. In addition, conventional detection cannot correct errors caused by partly non-orthogonal spreading codes and distortion of the signal over the radio path. In an optimal receiver, the information contained in the signals of all the users is taken into account, so the signals can be detected optimally using e.g. a Viterbi algorithm. The advantage of this detection method e.g. in a CDMA system is that the situation in the receiver resembles a one user CDMA system where there is no multiple access interference. For example, a near-far problem, which is typical of CDMA systems, does not arise. A near-far problem is a situation where the transmission from a transmitter close to the receiver blankets the more distant transmitters. The major drawback of the Viterbi algorithm is that the calculating efficiency that it requires increases exponentially as the number of the users rises. For example, with QPSK modulation, a ten-user system with a bit rate of 100 kbit/s would require 105 million operations per second in calculating the Viterbi algorithm. In practice, this makes it impossible to implement an optimal receiver.

It is possible to approximate, however, to an optimal receiver by different methods. Prior art teaches various methods for simultaneous multiuser detection (MUD). The best known of such methods are linear multiuser detection, a decorrelating detector and a multistage detector. These methods are described in greater detail in Varanase, Aazhang, 'Multistage detection for asynchronous code division multiple access communications,' *IEEE Transactions on Communications*, Vol. 38, pp. 509–519, April 1990; Lupas, Verdu, 'Linear multiuser detectors for synchronous code-division multiple access channels,' *IEEE Transactions on Information Theory*, Vol. 35, No. 1, pp. 123–136, January 1989; and Lupas, Verdu, 'Near-far resistance of multiuser detectors in asynchronous channels,' *IEEE Transactions on Communications*, Vol. 38, April 1990. These methods, however, also involve many operations, such as matrix inversion operations, that require a high calculating capacity.

Another way of solving the problems caused by multiple access interference is to use interference cancellation (IC) methods. In IC-type solutions, the users are detected individually, if possible, and often in the order of magnitude, in such a way that the effect of the signals of the already detected users is canceled from the received transmission before the next user is detected. An example for a solution of this kind is described in EP 491,668, where a procedure of the type described above is applied in a CDMA cellular radio system. Noise cancellation methods are more effective than MUD-type algorithms with respect to calculation, but their performance is lower especially in difficult reception conditions, such as in a fading multipath channel, where signals are often weak.

SUMMARY OF THE INVENTION

An object of the present invention is to provide a method in which a received signal can be detected in an advantageous manner even in the event of multiple access interference without unduly massive calculations.

This is achieved with a method characterized in that the received signals are divided into several groups comprising at least two signals each, and that in each group the signals are detected from the received transmission simultaneously.

The invention also relates to a receiver in a cellular radio system, the receiver comprising means for measuring the power level of each received signal. The receiver of the invention is characterized by comprising means for dividing the received signals into several groups comprising at least two signals each, and means for detecting the signals in each group from the received transmission simultaneously.

The method of the invention makes it possible to combine the advantages of noise cancellation methods with those of simultaneous multiuser detection by a radical reduction in calculation but with little sacrifice of performance.

BRIEF DESCRIPTION OF THE DRAWINGS

In the following the invention will be described in greater detail with reference to the examples of the attached drawings, wherein.

DETAILED DESCRIPTION OF THE PRESENTLY PREFERRED EXEMPLARY EMBODIMENTS

This invention is especially well-suited for use in a CDMA cellular radio system, but it can also be applied in a TDMA system, where co-channel interference is a problem. The invention can be applied both in a base station and a subscriber terminal. In the following the invention will be described in greater detail when applied in a base station of a CDMA cellular radio network, but the invention, however, is not limited thereto.

Figure 1:
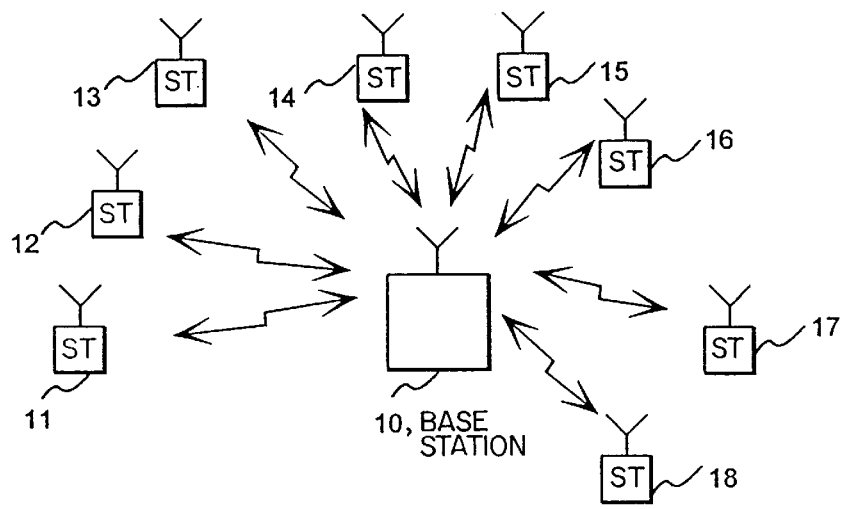
FIG. 1 shows an example of a cellular network where the method of the invention can be applied.

FIG. 1 illustrates part of a cellular radio system in which the method of the invention can be applied. In the cellular radio network, each cell comprises at least one base station 10 communicating with subscriber terminals (ST) 11–18 located in its area. The network concerned is here assumed to be a CDMA radio network. All the terminal equipment thus transmit at the same frequency to the base station 10, which distinguishes the transmissions of different terminal equipment from one another on the basis of the spreading codes of the terminal equipment. As stated above, the signals of the terminal equipment interfere with one another. The amount of interference can be estimated on the basis of the mutual cross-correlation levels of the signals. The power level appearing at the reception of each individual signal is measured in the receiver. The results obtained in the power measurement are utilized e.g. in power regulation.

In the method of the invention, the received signals are divided into groups, each group comprising at least two, and preferably three to ten, different signals. Within a group, the signals are detected from the received transmission simultaneously by a detection algorithm provided by simultaneous multiuser detection.

In a preferred embodiment of the invention, the signals are divided into groups on the basis of preliminary power measurement of the received signal: the signals received at the highest power are placed in one group, and the signals received at lower powers are placed in other groups, so that each group comprises signals received at approximately the same power. The division is easy to carry out since the signals are measured for power anyway because of power regulation.

In another embodiment of the invention, the signals are divided into groups on the basis of mutual cross-correlation estimates. The signals that interfere with one another the most can here be placed in the same group. This is effective in view of interference cancellation, since methods for simultaneous multiuser detection effectively eliminate mutual correlation. This, however, requires that the received signal is subjected to cross-correlation estimation with all signals contained in the transmission. If a large number of signals is received, the number of calculations needed increases considerably. One way of estimating cross-correlation between signals is to calculate a correlation estimate on the basis of the codes, code phases and channel parameters of the signals. Somewhat fewer calculations are thus needed.

In the method of the invention, simultaneous detection of signals within a group can be implemented by using known algorithms. The methods for regenerating and extracting detected signals can also be selected as desired. The advantage achieved with the invention is that system-specific parameters and methods can be selected according to what is suitable for a specific application, even dynamically, depending on what the load is and how reliable the estimation of the parameters needed is. The best implementation in each specific case depends on the need and the resources. For example, when the number of received signals is not large, the signals can be divided into groups on the basis of cross-correlation estimates, but as the number of the signals rises, it is possible to start dividing the signals on the basis of the received power. Also when the method is applied in different equipments, different algorithms can be used. Especially in radio phone applications, the noise cancellation resources and needs of the base station and the subscriber terminal are very different.

In a preferred embodiment of the invention, the signal groups are detected in succession such that the group comprising signals with the highest power levels is detected first. After the detection, the signals are regenerated and extracted from the received transmission. The interference of the already detected signals with the other signals can thus be eliminated. The second strongest group is then detected, and its effect is likewise extracted from the received transmission before the next group is detected. The same procedure is continued, proceeding towards the weakest group, until all the groups and signals have been detected.

In the example of FIG. 1, let the base station 10 perform the division into groups by placing subscriber terminals 11, 13 and 15 in the first group, terminals equipments 12, 16 and 18 in the second group, and terminals equipments 14 and 17 in the third group. The groups are detected in the order of magnitude, starting with the group whose received powers give the largest sum. Let this strongest group comprise signals from terminals equipments 11, 13 and 15. The signals of the group are detected simultaneously from the received transmission by a selected algorithm. The detected signals are then regenerated and extracted from the received transmission. The second strongest group is then detected, the group here being a group containing signals from terminals equipments 11, 16 and 18. The signals are detected from a transmission from which the interference of the already detected signals has been extracted. As above, the detected signals are extracted from the received transmission, whereafter the remaining group, which comprises signals from terminal equipments 14 and 17, is detected.

In a preferred embodiment of the invention, the signal groups are detected in parallel. The detection of one group is then not dependent on the detection of another group as in the previous embodiment.

As above, let the base station 10 in the example of FIG. 1 conduct the division into groups by placing subscriber terminals 11, 13 and 15 in the first group, terminals 12, 16 and 18 in the second group, and terminals 14 and 17 in the third group. In another embodiment of the invention, all three signal groups are detected in parallel, independent of one another. The groups may be detected simultaneously, but this is not essential to the embodiment.

By the method of the invention, calculations needed in the detection of the received transmission can be reduced significantly. For example, to detect 15 users from the output of the matched filters, a decorrelating detector requires about $15^3=3,375$ multiplications, whereas the division into three groups requires only about $3*5^3=375$ multiplications, i.e. calculation needed is here reduced almost to a ninth part. With the Viterbi algorithm, even more is saved, since its complexity increases exponentially as a function of the number of users.

Figure 2:
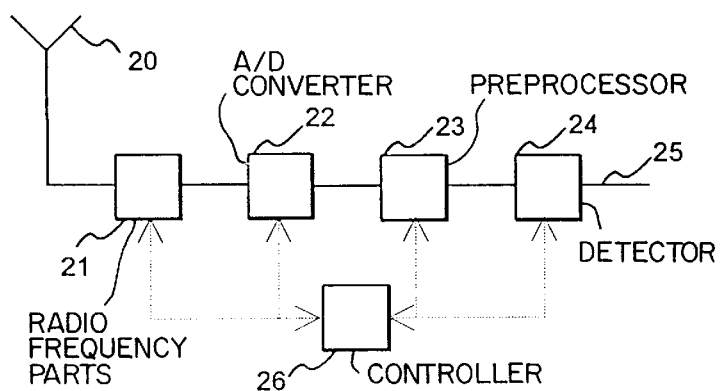
FIG. 2 is a block diagram illustrating the structure of a receiver according to the invention.

FIG. 2 is a block diagram illustrating the structure of a receiver according to the invention. The receiver of the invention comprises an antenna 20 by which the received signal is supplied to radio frequency parts 21. From the radio frequency parts, the signal is supplied through an A/D converter 22 to means 23, which pre-process the received transmission by conducting it to preliminary power measurement, on the basis of which the received signals can be divided into groups. The receiver also comprises means 24 for detecting the received signal. A signal 25 obtained from the detection means is supplied further to other parts of the receiver. The receiver also comprises controlling means 26, which control the operation of the above-mentioned parts.

Figure 3:
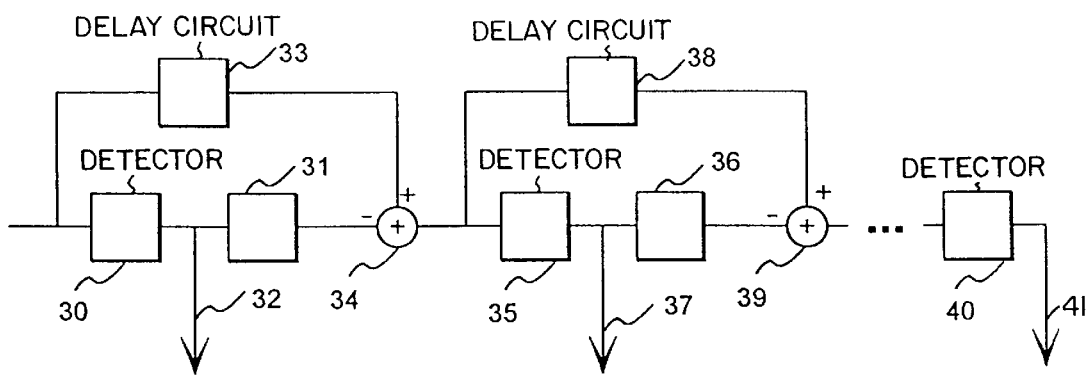
FIG. 3 is a block diagram illustrating the structure of a noise cancellation system of a receiver according to the invention.

FIG. 3 is a block diagram illustrating in greater detail the general structure of a detector block of a receiver according to a preferred embodiment of the invention. The detector block receives an input of the received transmission comprising the signals of all the received users. Let the total number of signals from the users be N, and the signals be divided into K groups having M signals each. In reality, the number of the signals is not necessarily the same in every group. The detector block comprises means 30 for simultaneous detection of the signals belonging to the first group. Detected signals 32, which thus comprise the signals of the first M users, are supplied for further processing, and to means 31, where the detected signals are regenerated for interference cancellation. The received transmission is supplied through a delay circuit 33 to an adder 34, where the output of the regenerating means 31 is extracted therefrom. The interference of the signals belonging to the first group with the other signals is thus eliminated. Correspondingly, the detector block comprises means 35 for simultaneous detection of the signals of the second group, and means for regenerating detected signals 37. In the second group, the detected signal thus here comprises the signals of the next M users. The receiver further comprises adding means 39, by which the regenerated signals are extracted from the transmission supplied to the adder 39 through a delay circuit 38. The detector block comprises corresponding means for detecting all K groups. In a last detector 40 is detected the remaining group; detected signals 41 belonging to this group need not be regenerated but can be supplied for further processing in the receiver.

Where a CDMA receiver is concerned, each detector means 30, 35 and 40 comprises a RAKE receiver in a preferred embodiment of the invention, and filters matched with the spreading codes of the signals to be detected. In the receiver, the block 23 for preprocessing the signal can be implemented in many ways. One alternative is to utilize the matched filters of the detector blocks at the beginning of the reception process: the matched filters conduct preliminary power measurement, on the basis of which a preliminary division of the signals into groups is performed, and after which the measurement can be specified iteratively.

Figure 4:
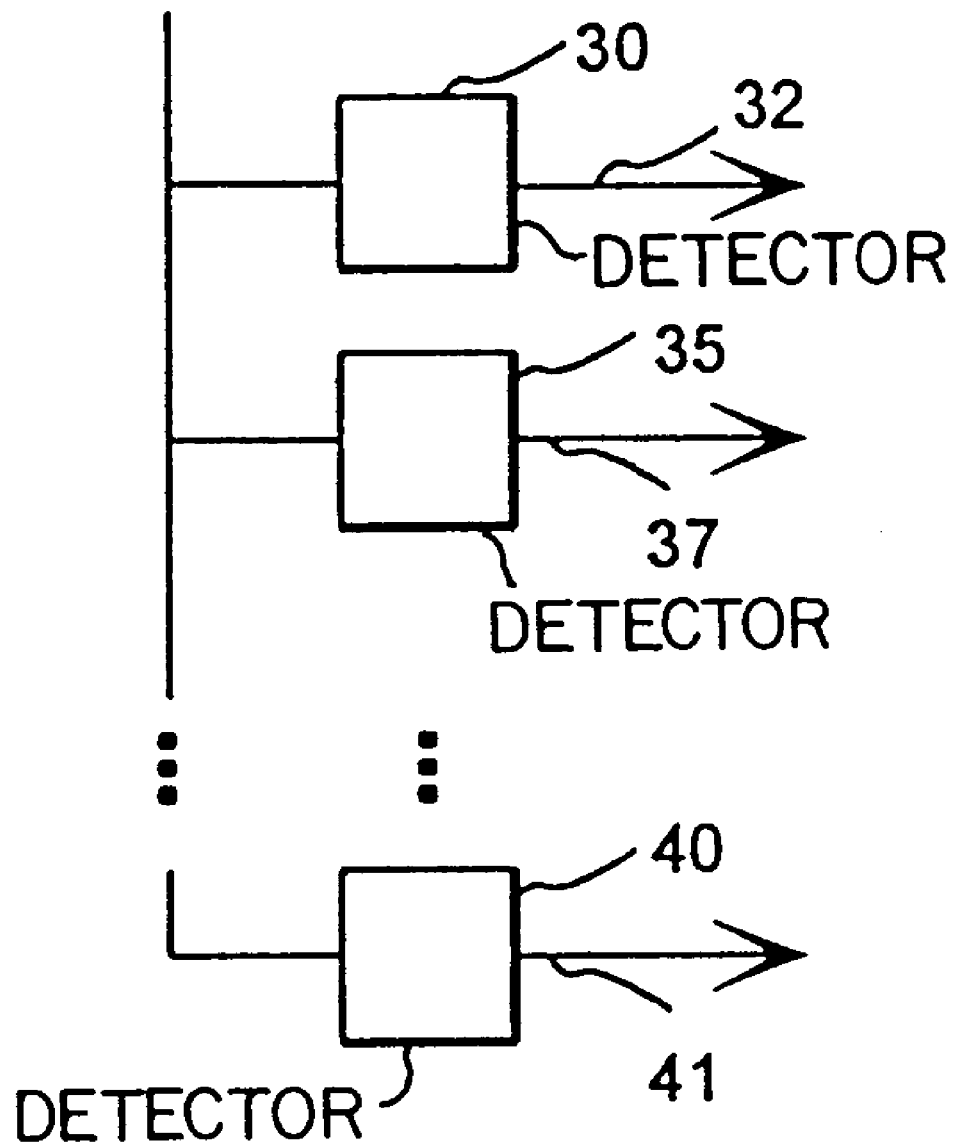
FIG. 4 is a block diagram illustrating an alternative structure of a noise cancellation system of a receiver according to the invention.

FIG. 4 is a block diagram illustrating the general structure of a detector block of a receiver according to another embodiment of the invention. The detector block receives an input of a received transmission comprising the signals of all the received users. As above, let the total number of signals from the users be N, and the signals be divided into K groups having M signals each. In reality, the number of the signals is not necessarily the same in every group. The detector block comprises means 30, 35, 40 for detecting signal groups. The means are connected in parallel such that all the means receive an input of the same received transmission. Each means detects a predetermined signal group by detecting the signals of the group simultaneously. For example, let means 30 detect the first group, means 35 the second group, and means 40 the Kth group. Detected signals 32, which thus comprise the signals of the first M users, are supplied for further processing. Detected signals 37, 40 are processed in the same manner. Since the signal groups are thus detected in parallel, their detection is not interdependent.

Although the invention is described above with reference to the example illustrated in the attached drawings, it is to be understood that the invention is not limited thereto but can be modified in many ways within the inventive idea disclosed in the attached claims. The reception method of the invention can also be used, for example, as a pre-stage in a multistage receiver or a receiver of some other type.

We claim:

1. A reception method in a cellular radio system in which the receiver measures a power level of each received signal, where the signal comprises signals from different users, the method comprising:

dividing received signals into several groups comprising at least two signals each, the signals in each group being from different users, and in each group, simultaneously detecting the signals from the received transmission using simultaneous multi-user detection by taking account correlations with other user signals in the respective group.

2. The method of claim 1 wherein each group is detected in succession, the method further comprising:

regenerating the signals of already detected groups and extracting the signals from the received transmission before the next group is detected.

3. The method of claim 1, wherein the groups are detected in parallel.

4. The method of claim 2, wherein the groups are detected in succession such that the group comprising signals with the highest received power level is detected first.

5. The method of claim 1, wherein the received signals are divided into groups on the basis of the received power level.

6. The method of claim 1, wherein the received signals are divided into groups on the basis of mutual cross-correlation levels such that the signals that interfere with one another the most are placed in the same group.

7. The method of claim 1,wherein the received signals are supplied by a plural number of users.

8. The method of claim 1, wherein the received signals are supplied by one and the same user.

9. The method of claim 1, wherein the cellular radio system employs a CDMA multiple access method.

10. The method of claim 1, wherein the cellular radio system employs a TDMA multiple access method.

11. A receiver in a cellular radio system comprising:

means for measuring the power level of each signal of a plurality of received signals where the signals comprise signals from different users, means for dividing received signals into several groups comprising at least two signals each, the signals in each group being from different users, and means for simultaneously detecting the signals in each group from a received transmission using simultaneous multi-user detection by taking account correlations with other user signals in the respective group.

12. The receiver of claim 1, further comprising:

means for detecting the groups in succession, means for regeneration, and means for extracting the signals of the already detected groups from the received transmission before the next group is detected.

13. The receiver of claim 12, further comprising:

means for detecting the groups in succession such that the group comprising signals with the highest received power level is detected first.

14. The receiver of claim 11, further comprising means for detecting the groups in parallel.

15. The receiver of claim 11, wherein the cellular radio system employs a CDMA multiple access method, and wherein the means for detecting the groups comprises:

a RAKE receiver and a plurality of filters matched with the spreading codes of signals to be detected.

* * * * *

UNITED STATES PATENT AND TRADEMARK OFFICE
CERTIFICATE OF CORRECTION

PATENT NO.    : 5,933,423
DATED         : August 3, 1999
INVENTOR(S)   : LAAKSO et al.

It is certified that error appears in the above-identified patent and that said Letters Patent is hereby corrected as shown below:

Title page, item

"[73]" change "Salo, Finland" to --Espoo, Finland and Nokia Mobile Phones Ltd., Salo, Signed and Sealed this Twenty-ninth Day of August, 2000

Attest:

Q. TODD DICKINSON

*Attesting Officer*            *Director of Patents and Trademarks*